United States Patent [19]
Schoessow et al.

[11] Patent Number: 4,861,444
[45] Date of Patent: Aug. 29, 1989

[54] PROCESS FOR TREATING RADIOACTIVE MATERIAL TO MAKE IT SAFE FOR DISPOSAL

[76] Inventors: Glen J. Schoessow, 300 N.W. 34th Ter., Gainesville, Fla. 32607; John A. Wethington, Jr., 109 N.W. 22nd Dr., Gainesville, Fla. 32605

[21] Appl. No.: 240,674

[22] Filed: Sep. 6, 1988

[51] Int. Cl.[4] .................... C02F 1/46
[52] U.S. Cl. .................... 204/130; 204/149
[58] Field of Search .................... 204/130, 140, 149

[56] References Cited

U.S. PATENT DOCUMENTS

| | | | |
|---|---|---|---|
| 3,320,175 | 5/1967 | Podberesky | 204/149 |
| 4,615,776 | 10/1986 | Sasaki | 204/130 |

*Primary Examiner*—T. M. Tufariello
*Attorney, Agent, or Firm*—Arthur G. Yeager

[57] ABSTRACT

An aqueous medium containing radioactive material, e.g., ions, is subjected to electrolysis employing nonmetallic electrodes until the medium contains less than about 1% of its original radioactivity; the electrodes are then removed from the electrolytic process and pyrolyzed in an inert atmosphere, or a vacuum at least one hour; and the pyrolyzed electrodes are then recovered containing the radioactive material in a stable nonleachable state, suitable for safe disposal.

8 Claims, No Drawings

PROCESS FOR TREATING RADIOACTIVE MATERIAL TO MAKE IT SAFE FOR DISPOSAL

BACKGROUND OF THE INVENTION

One of the most critical problems in the use of radioactive materials, whether used commercially or in research, has been to find methods for safely disposing of the waste materials. In earlier times it was thought that underground burial or deep sea burial would be satisfactory because of the shielding value of many feet of earth or sea water. These methods proved to be unsatisfactory because underground water and deep sea currents transferred the radioactive materials away from the burial site; and the half-lives of the radioactive materials were so large that the radiation from each material would last for long periods of time. These two factors have made burial techniques societally unacceptable. Treatment processes were employed to concentrate the radioactive materials in a more chemically stable form. Such processes were very expensive, very time-consuming, or otherwise unsuccessful. There has been great need to find a satisfactory method for making such radioactive materials safely disposable.

It is an object of this invention to provide a satisfactory process for treating radioactive materials to make them disposable in an accepted ecological manner. It is another object of this invention to provide an electrolysis process for treating aqueous media containing radioactive materials to make them into a mass from which the radioactive materials are nonleachable. Still other objects will become apparent from the more detailed description which follows.

BRIEF SUMMARY OF THE INVENTION

This invention relates to a process for making radioactive waste material disposable in an ecologically acceptable manner, which comprises:

(a) preparing a solution or a dispersion of radioactive waste material in a liquid electrolyte;

(b) subjecting the solution or dispersion to an electrolysis employing nonmetallic electrodes;

(c) pyrolyzing the electrodes in an inert atmosphere; and (d) recovering the pyrolyzed electrodes containing said radioactive waste material that is substantially inseparable from the pyrolyzed electrode material by leaching.

In preferred embodiments of the invention the electrolyte is water, the electrode is graphite, the electrolysis process involves voltages of 3-10 volts and times of at least one hour, and the pyrolysis step involves heating in a vacuum at 300° -500° C. for at least one hour.

DETAILED DESCRIPTION OF THE INVENTION

The process of this invention generally involves four steps:

(1) preparing a solution or dispersion of the radioactive material in an electrolyte;

(2) inserting electrodes in the solution or dispersion and performing an electrolysis on the solution or dispersion;

(3) removing the electrodes from the solution or dispersion and pyrolyzing them in an inert atmosphere; and (4) recovering the pyrolyzed electrodes as material to be stored, buried, or otherwise put into a waste disposal location.

The first of these steps involves the preparation of a liquid mass containing the radioactive material for electrolysis. Generally, the liquid, which will eventually be the electrolyte in the electrolysis step is water or an aqueous solution which is a good conductor of electricity. Preferably, the mass is an aqueous solution of the radioactive material such that the radioactive material is in the form of ions which can readily move to an electrode through the aqueous medium. Although it is preferred to have the aqueous medium as free as possible of other ions than those of the radioactive material, it is entirely possible for the medium to contain other ions, so long as they do not materially interfere with the deposition of the radioactive ions on one electrode in the electrolysis process step.

The second step is a process of electrolysis of the aqueous medium containing the radioactive material. Electrodes must be chosen and after immersion in the aqueous medium, a suitable voltage must be applied for a period sufficient to remove as much radioactivity from the medium as is feasible. The electrodes must be nonmetallic, by which is meant that the electrodes must not be elemental metal or metal alloy. The electrode may be a metal compound, such as a metal oxide. Typical of such materials are aluminum oxide, zirconium oxide, and titanium dioxide. Preferably, the electrode is a porous refractory material such as any of the ceramics. The most preferred of all is graphite.

The electrolysis process, of course, merely involves imposing a voltage differential across the electrodes. The differential may vary with different components, i.e., media of different concentrations of solutes or dispersed materials; and with different media, i.e., pure water or aqueous solutions. Generally, the voltage differential will be 3–10 volts.

The time of the electrolysis process step is important in that longer times will produce more deposition of the radioactive ions onto the appropriate electrode. This can also be viewed as a removal of radioactive ions from the electrolyte. A convenient measure of completion is to test the electrolyte for residual radioactivity at various times. It is considered, as an arbitrary standard, that when at least 99% of the radioactivity has been removed from the electrolyte a satisfactory purification has been accomplished. The removed ions are deposited on the electrodes.

The third step is pyrolysis of the electrodes containing deposited radioactive ions. This is accomplished by heating the electrode at a temperature of 300° -500° C. for a sufficient time in an inert atmosphere to cause the radioactive material to become trapped in the electrode by becoming coated with the electrode material. Exactly how the material is trapped is not known, but it is believed to be the result of fractial growth and/or vapor deposition phenomena within the electrode, e.g., graphite.

The pyrolysis is accomplished by heating, e.g., in an oven at temperatures of about 300° -500° C. in an inert atmosphere. A preferred environment is a vacuum. Nitrogen is an acceptable atmosphere in many embodiments of the invention.

The time of pyrolysis is a variable that is not critical although enough time is needed to cause the radioactive materials to become entrapped in the electrode material. Higher temperatures generally correlate with shorter heating times. A suitable combination for graphite electrodes is about 400° C. for about 1.5 hours. Experimental testing will determine the temperature and times most suitable for any given type of radioactive material with a specific electrode composition. A test to determine whether and to what extent the radioactive material is leachable from the pyrolyzed electrode is normally employed. Leaching with dilute acetic acid is recommended as an accelerated test to determine how much, if any, of the trapped radioactive material can be leached from the pyrolyzed electrodes in a given period of time.

EXAMPLE 1

A solution containing 99 mTc as $TcO_4^-$ at the tracer level was employed. Two ml of the solution were electrolyzed for 25 minutes at 3.8 volts. Small graphite electrodes were employed.

Eighty percent of the radioactivity was removed from the solution during the electrolysis. Ninety-seven percent of the activity was deposited on the cathode. Thus, $TcO_4^-$ ion was changed into a cation and removed as Tc or $TcO_2$.

The cathode was broken into three parts, and each portion was subjected to a different treatment s shown in the table.

| Part No. | Treatment | Distribution Coefficient, D, ml,/gm. |
|---|---|---|
| I | Coat with oil, heat at 300° C., inert atmosphere 75 min. | 704 |
| II | Heat at 500° C., inert atmosphere, 75 min. | 317 |
| III | No treatment | 370 |

The three pieces of graphite were then leached with dilute acetic acid for 6 hours and 45 minutes, and distribution coefficients, D, defined as $$D = \frac{\text{cpm/gm graphite}}{\text{cpm/ml leachant}}$$

were determined. The resulting values are shown in the table.

EXAMPLE 2

In another set of experiments, the tracer solution was electrolyzed at 3.7 volts for various times. Eighty percent of the activity was removed in 43 minutes, 93% in 73 minutes, and >99% in less than 17 hours. The exact time interval for the latter experiment was uncertain; the anode was partially destroyed during the electrolysis.

These results show that (a) radioactivity can be removed from aqueous solutions by electrolysis using the graphite electrodes and (b) radioactivity incorporated into the graphite cathode is resistant to leaching by dilute acetic acid.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A process for making radioactive waste material disposable in an ecologically acceptable manner, which comprises: (a) preparing a solution or a dispersion of radioactive waste material in a liquid electrolyte; (b) subjecting the solution or dispersion to an electrolysis employing nonmetallic electrodes; (c) pyrolizing the electrodes containing said radioactive waste material that is substantially inseparable from the pyrolized electrode material by leaching.

2. The process of claim 1 wherein said electrolyte is water.

3. The process of claim 1 wherein said electrodes are graphite.

4. The process of claim 1 wherein said electrolysis is conducted under conditions of voltage and time such that the said solution or dispersion contains less than 1% of its original radioactivity.

5. A process for treating radioactive material deposited on an electrode in an aqueous electrolytic processing step to produce a disposable mass containing said radioactive material as a nonleachable component; said process comprising: pyrolyzing said electrodes in an inert atmosphere; recovering a pyrolyzed electrode containing said radioactive material that is substantially inseparable therefrom by leaching.

6. The process of claim 5 wherein said inert atmosphere is a vacuum or an inert gas.

7. The process of claim 5 wherein said electrodes are pyrolized for a period of about one hour at a temperature of about 300° -500° C.

8. The process of claim 5 wherein said electrodes are graphite.

* * * * *